H. KEYNTON.
PRESSURE GAGE.
APPLICATION FILED AUG. 21, 1915.

1,333,549.

Patented Mar. 9, 1920.

WITNESSES:
René Buine
Fred White

INVENTOR
Howard Keynton,
By Attorneys,

UNITED STATES PATENT OFFICE.

HOWARD KEYNTON, OF WEST HOBOKEN, NEW JERSEY, ASSIGNOR TO A. SCHRADER'S SON, INCORPORATED, OF BROOKLYN, NEW YORK, A CORPORATION OF NEW YORK.

PRESSURE-GAGE.

1,333,549.   Specification of Letters Patent.   Patented Mar. 9, 1920.

Application filed August 21, 1915. Serial No. 46,618.

*To all whom it may concern:*

Be it known that I, HOWARD KEYNTON, a citizen of the United States, residing in West Hoboken, in the county of Hudson and State of New Jersey, have invented certain new and useful Improvements in Pressure-Gages, of which the following is a specification.

This invention relates to pressure gages, and aims to provide certain improvements therein.

The invention is particularly directed to certain improvements in the gage set forth in the application of Schweinert & Kraft No. 552,111, filed March 28, 1910, wherein the gage comprises a casing having a cylinder within it in which moves a piston which moves an indicating sleeve arranged within the casing, the loading spring being interposed between the cylinder and the indicating sleeve. Among the objects of the present invention is to simplify this construction in such manner as to facilitate the operations of manufacture, assemblage, and repair. The invention includes certain features of improvement which are hereinafter pointed out.

Referring to the drawings,—

Figure 1:
Figure 1 is a side elevation of the complete gage, the indicating sleeve being shown as partly extended.
Figure 3:
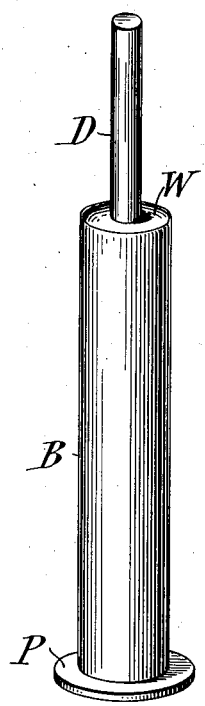
Fig. 3 is a perspective view of the cylinder and piston.
Figure 2:
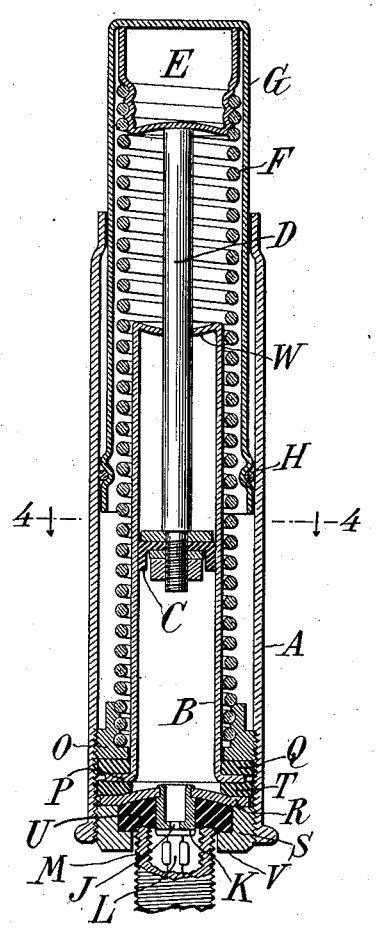
Fig. 2 is a diametrical section of Fig. 1 on an enlarged scale.
Figure 4:
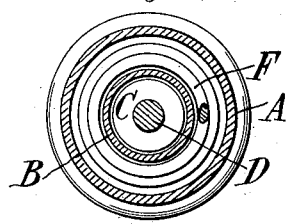
Fig. 4 is a cross section on the line 4—4 in Fig. 2.

Referring to the drawings, let A indicate the casing which is preferably cylindrical in form. B is a cylinder arranged within the casing, in which cylinder is located a piston C having a piston rod D extending through the upper end thereof, and engaging the under side of a head E. The head E is connected with the upper end of a loading spring F, the lower end of the spring being connected with the casing. The head engages an indicating sleeve G which is provided at its lower end with a friction ring H by means of which the sleeve is retained in its indicating position after the pressure is removed from the gage. Air under pressure is introduced into the gage through an opening J formed in a pin K which is adapted to depress the stem L of a tire valve when the gage is pressed down upon the top of a valve shell M.

In a general way these parts are present in the Schweinert & Kraft construction before alluded to.

According to the present invention the cylinder B and piston rod D are disconnectible from the loading spring so that these parts may be applied and removed without reference to the spring. In the present instance the spring is connected to the gage casing by a hollow screw-threaded plug O, the spring preferably engaging the interior of the plug as shown. The upper end of the spring is connected to the exterior of the head E. In both instances the connection is preferably made by forming a coarse thread on the parts and screwing the spring into engagement therewith.

The cylinder B is preferably formed at its lower end with a flange P which is held against upward movement by the plug O, a packing Q being preferably interposed between the two to make a tight joint between the parts. The cylinder is held against downward movement by a plate R which is itself retained in place by a threaded sleeve S screwing into the bottom of the casing. A packing T is preferably interposed between the plate R and the flange P of the cylinder. The plate R conveniently serves as a holder for the depressing pin K. A packing U is usually provided for making a tight joint with the valve shell M, the packing being retained by the sleeve S which is provided with a lower flange V for this purpose.

In process of construction the loading spring F is connected to the head E and plug O, and these three parts constitute an assembled structure which can be easily and conveniently handled. The cylinder and piston, being separable from the spring and its attached members O and E, may be applied as a unit after the spring and its members are introduced in the gage. In case it is necessary to repair the piston, as by changing or adjusting the packing, these parts may be removed from the gage and again replaced without the necessity of disturbing the spring and its connections. This feature is also of importance for the reason that the spring constitutes the loading member of the gage, and after it is once adjusted to obtain an accurate registering it is undesirable to disturb it. By the present construction the cylinder and piston may be removed (or the piston alone, if this is desired) without altering the adjustment of the spring, or disturbing its position.

I preferably construct the piston rod D of less diameter than the piston, and form a guide such as cylinder head W to prevent tilting of the piston rod. The head W also serves the useful purpose of providing a stop for the piston head so that in case of excessive pressure the spring shall not become overloaded or the registering sleeve jammed against the top of the casing. The head W also insures that the piston will be removed with the cylinder when the latter is detached.

While I have shown and described the preferred form of my invention, it will be understood that I do not wish to be limited thereto, as various changes can be made therein without departing from the invention.

My invention does not consist of the broad combination of a gage having a press-on foot and means for maintaining the indicating member in indicating position after the gage is removed from the tire valve, since this broad combination was not invented by me.

What I claim is:—

1. In a tire pressure gage or the like, the combination of a casing, a loading spring secured at one end within the casing, and a pressure cylinder and its piston within the casing and spring, means for detachably securing said cylinder within the casing, said cylinder and piston being unsecured to the spring, and being removable independently of the spring.

2. In a tire pressure gage or the like, the combination of a casing, a loading spring within the casing, means for attaching the loading spring to the casing, a spring holder at the top of said spring, a cylinder within the casing and spring, and a piston having a piston rod adapted to move said spring holder, said cylinder and piston being unsecured to said spring holder, said attaching means, and said loading spring.

3. In a tire pressure gage or the like, the combination of a casing, a loading spring, a hollow plug for connecting the lower end of the loading spring to the casing, a spring holder connected to the upper end of the spring, and a cylinder within said spring having a flange at its lower end and a piston moving in said cylinder and having a piston rod contacting with said spring holder.

4. In a tire pressure gage or the like, the combination of a casing, a loading spring, a hollow plug at the lower end of said spring for attaching the same to the casing, a cylinder within said spring having a flange fitting beneath said hollow plug, a piston moving in said cylinder, and means whereby the spring acts upon the piston.

5. In a tire pressure gage or the like, the combination of a casing, a loading spring, a hollow plug at the lower end of said loading spring for connecting it to the casing, a cylinder within said spring and having a flange fitting beneath said plug, a packing between said plug and flange, a packing beneath said flange, and means for compressing said packings.

6. In a tire pressure gage or the like, the combination of a casing, an indicating sleeve within said casing, a loading spring within said sleeve, a spring holder connected to the upper end of said spring fitting within said sleeve and engaging the top thereof, means for connecting the lower end of said spring to the casing, a cylinder within said spring, a piston within said cylinder, and having a piston rod contacting with said spring holder.

7. A tire pressure gage or the like comprising a casing having an indicating member, a loading spring, a cylinder formed separately from the casing and having therein a piston adapted to operate under pressure against said spring, said cylinder and piston being unsecured to said spring and indicating member, and said indicating member being moved by said piston to indicating position, means for securing both the cylinder and spring in said casing, and means whereby the spring acts upon the piston.

8. A tire pressure gage or the like comprising a casing, an indicating sleeve movable within said casing, a loading spring, means for connecting the lower end of said loading spring to the casing, a cylinder fitting within said spring and having a piston therein, means whereby said spring acts upon said piston, said cylinder and piston being unsecured to said loading spring and indicating sleeve, and means for securing the cylinder in said casing.

9. A tire pressure gage or the like comprising a casing, a loading spring connected thereto, a pressure cylinder, means for normally fixing said cylinder within said casing and within said spring, a piston within said cylinder and having a piston rod, said cylinder having a head through which said piston rod moves, and means whereby said spring acts upon said rod to oppose movement of the piston in one direction.

10. In a tire pressure gage or the like, a cylinder open at its bottom to admit a piston and having an integral flange at its foot for connecting it to a tire gage casing on the inside of the latter, said cylinder having a piston operating within it but containing no springs and having no means for connection therewith, whereby the piston may move substantially from end to end of the cylinder, and a piston rod extending from said piston out through the top of said cylinder whereby to operate a spring-loaded part.

11. In a tire pressure gage or the like, a cylinder open at its bottom to admit a piston and having an integral flange at its foot for connecting it to a tire gage casing on the inside of the latter, said cylinder having a piston operating within it but containing no springs, and having no means for connection therewith, whereby the piston may move substantially from end to end of the cylinder, a piston rod extending from said piston out through the top of said cylinder whereby to operate a spring-loaded part, and said cylinder having an integral cylinder head provided with a hole through which said piston rod extends.

12. In a tire pressure gage or the like, the combination of a tubular casing, an indicating sleeve slidable along said casing, a cylinder fitting within said casing and of smaller diameter than said indicating sleeve so that it may lie within the latter, a piston movable in said cylinder and having a piston rod extending through the top thereof, and means for opposing the movement of said piston, said means being disconnected from said piston rod.

In witness whereof, I have hereunto signed my name in the presence of two subscribing witnesses.

HOWARD KEYNTON.

Witnesses:
GRACE GUNDERMAN,
FRED WHITE.